US012803108B2

(12) United States Patent
Park et al.

(10) Patent No.: US 12,803,108 B2
(45) Date of Patent: Nov. 17, 2026

(54) BATTERY PACK AND DEVICE INCLUDING THE SAME

(71) Applicant: LG Energy Solution, Ltd., Seoul (KR)

(72) Inventors: Jin Yong Park, Daejeon (KR); Wooyong Kwon, Daejeon (KR); Seung Joon Kim, Daejeon (KR); Insoo Kim, Daejeon (KR); Song Ju Shin, Daejeon (KR); Myungwoo Lee, Daejeon (KR); Seyun Jung, Daejeon (KR); Ho June Chi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 400 days.

(21) Appl. No.: 18/714,436

(22) PCT Filed: Jul. 12, 2023

(86) PCT No.: PCT/KR2023/009963
§ 371 (c)(1),
(2) Date: May 29, 2024

(87) PCT Pub. No.: WO2024/019414
PCT Pub. Date: Jan. 25, 2024

(65) Prior Publication Data

US 2025/0030116 A1 Jan. 23, 2025

(30) Foreign Application Priority Data

Jul. 20, 2022 (KR) ........................ 10-2022-0089844
Jun. 14, 2023 (KR) ........................ 10-2023-0076240

(51) Int. Cl.
*H01M 50/358* (2021.01)
*H01M 50/211* (2021.01)
(Continued)

(52) U.S. Cl.
CPC ....... *H01M 50/358* (2021.01); *H01M 50/211* (2021.01); *H01M 50/276* (2021.01); *H01M 2220/20* (2013.01)

(58) Field of Classification Search
CPC ............. H01M 50/211; H01M 50/342; H01M 50/358; H01M 50/383
See application file for complete search history.

(56) References Cited

U.S. PATENT DOCUMENTS

2008/0171259 A1 7/2008 Kanai et al.
2018/0047954 A1 2/2018 Yoo et al.
(Continued)

FOREIGN PATENT DOCUMENTS

CN 112467285 A 3/2021
CN 214625208 U 11/2021
(Continued)

OTHER PUBLICATIONS

International Search Report for PCT/KR2023/009963 mailed Oct. 19, 2023. 4 pages.
(Continued)

*Primary Examiner* — Kevin E Yoon
(74) *Attorney, Agent, or Firm* — Lerner David LLP

(57) ABSTRACT

A battery pack according to an embodiment of the present invention includes a plurality of battery cells in which battery cells each including a sealing portion are stacked in one direction, a cell cover that covers at least a part of the plurality of battery cells, a venting passage formed between the sealing portion of the plurality of battery cells and the cell cover, and an adhesive layer disposed in an inner surface of the venting passage.

13 Claims, 7 Drawing Sheets

(51) Int. Cl.

| | |
|---|---|
| ***H01M 50/276*** | (2021.01) |
| ***H01M 50/342*** | (2021.01) |
| ***H01M 50/383*** | (2021.01) |

(56) References Cited

U.S. PATENT DOCUMENTS

| | | | |
|---|---|---|---|
| 2022/0021074 | A1 | 1/2022 | Mabrey et al. |
| 2022/0052392 | A1 | 2/2022 | Jeon et al. |
| 2022/0173475 | A1 | 6/2022 | Choi et al. |
| 2022/0181742 | A1 | 6/2022 | Mabrey et al. |
| 2024/0072374 | A1 | 2/2024 | Kim et al. |
| 2024/0088515 | A1 | 3/2024 | Lee et al. |
| 2024/0106066 | A1 | 3/2024 | Kim et al. |
| 2025/0087826 | A1 | 3/2025 | Park et al. |

FOREIGN PATENT DOCUMENTS

| | | | | |
|---|---|---|---|---|
| CN | 114614142 | A | 6/2022 | |
| DE | 202020211009 64 | U1 * | 3/2021 | .......... H01M 50/342 |
| EP | 3301738 | B1 | 4/2020 | |
| EP | 4044346 | A1 | 8/2022 | |
| EP | 4277000 | A1 | 11/2023 | |
| EP | 4333183 | A1 | 3/2024 | |
| EP | 4395038 | A1 | 7/2024 | |
| JP | 2001060453 | A | 3/2001 | |
| JP | 2008117765 | A | 5/2008 | |
| JP | 2012028353 | A | 2/2012 | |
| JP | 2017134952 | A | 8/2017 | |
| KR | 20150091898 | A | 8/2015 | |
| KR | 20180005456 | A | 1/2018 | |
| KR | 20220021143 | A | 2/2022 | |
| KR | 20220035025 | A | 3/2022 | |
| KR | 20220075710 | A | 6/2022 | |
| KR | 20230070861 | A | 5/2023 | |
| WO | 2022149962 | A1 | 7/2022 | |

OTHER PUBLICATIONS

Extended European Search Report including Written Opinion for Application No. 23843264.5 dated Jun. 17, 2025, pp. 1-9.

* cited by examiner

【FIG. 1】
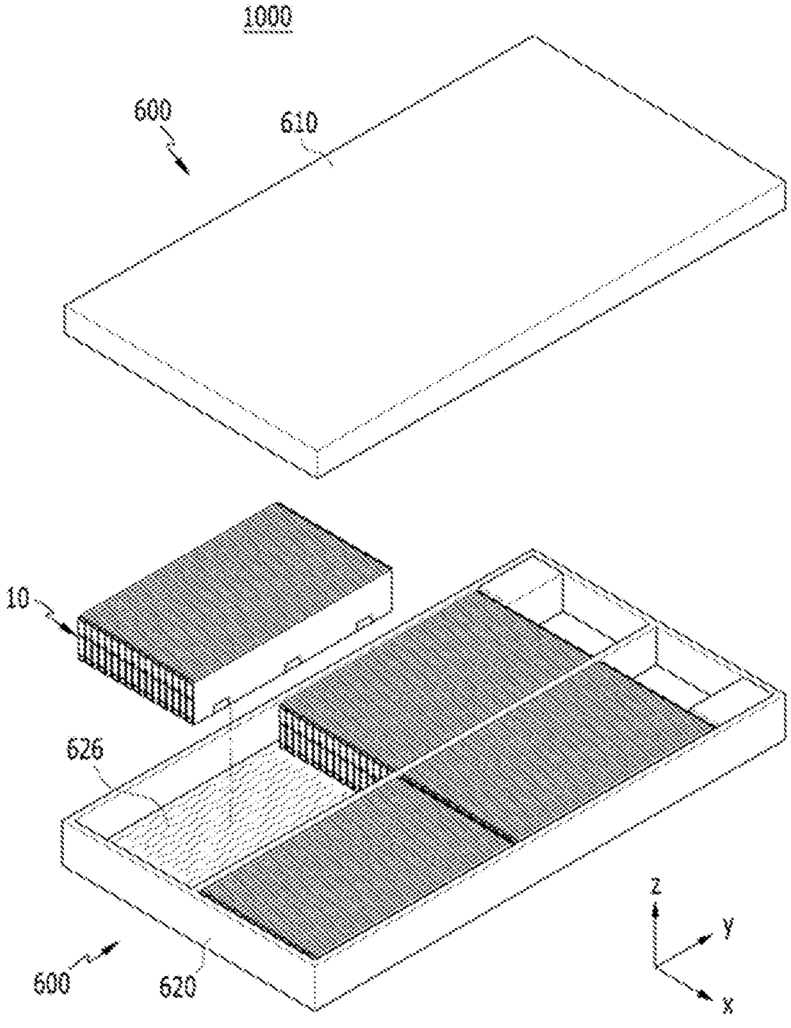

【FIG. 2】
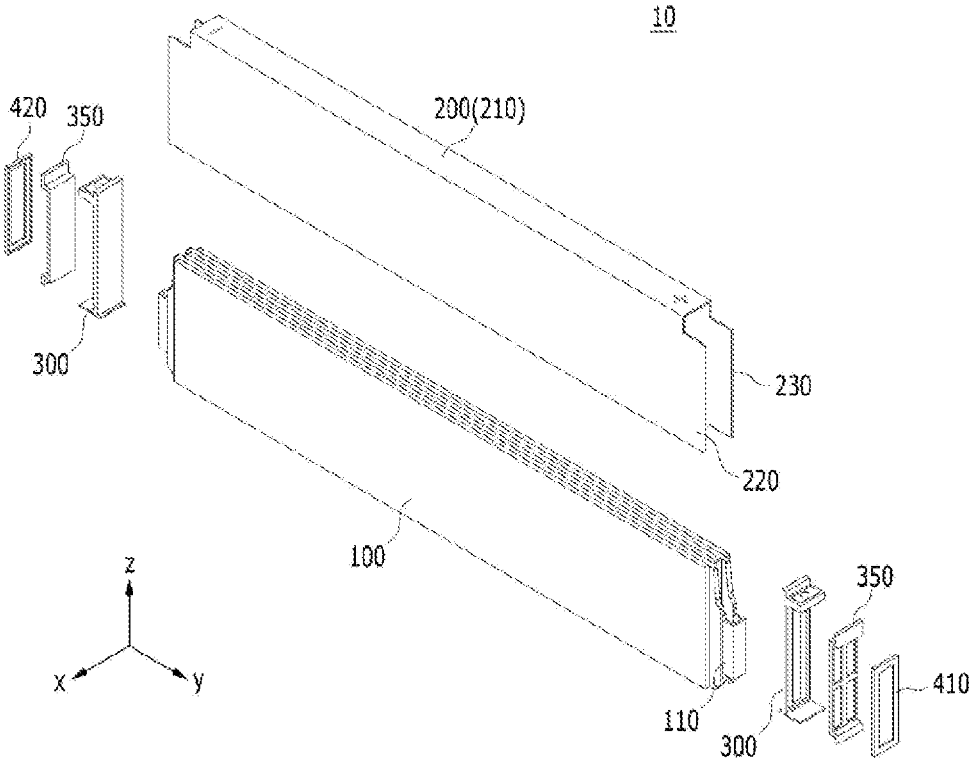

【FIG. 3】
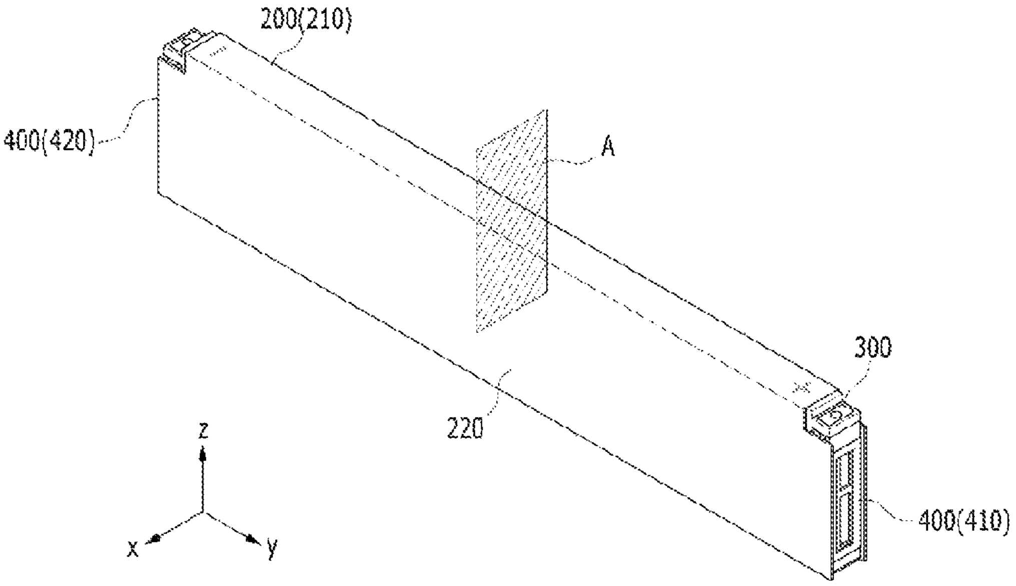

【FIG. 4】
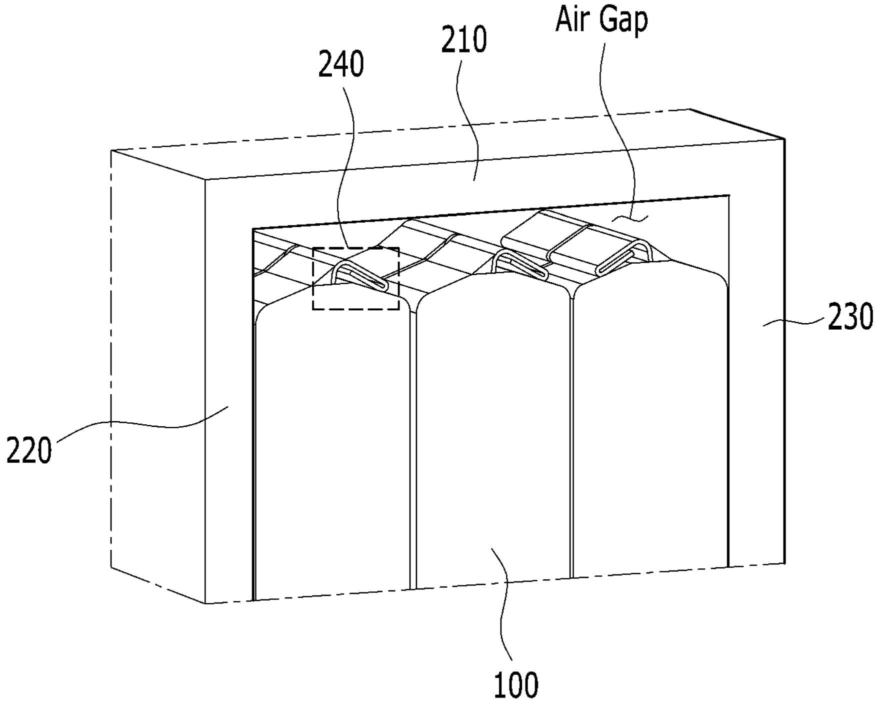

【FIG. 5】
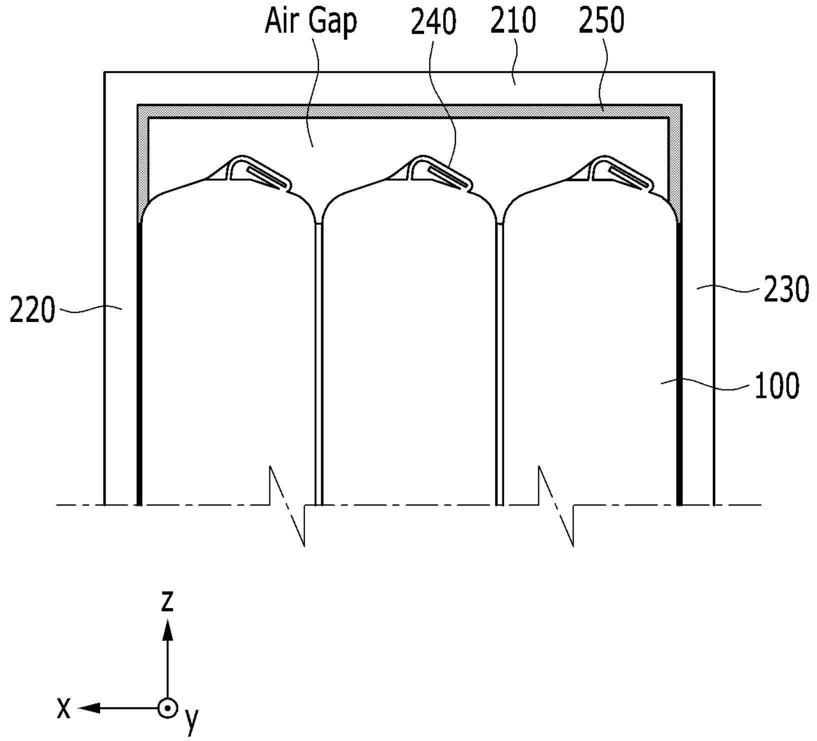

【FIG. 6】
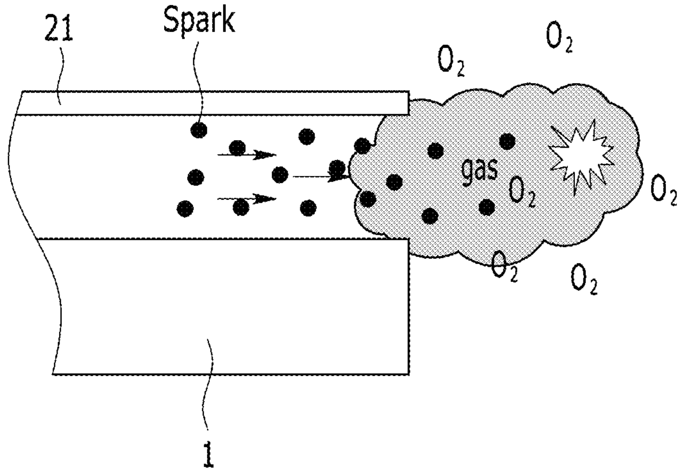
【FIG. 7】
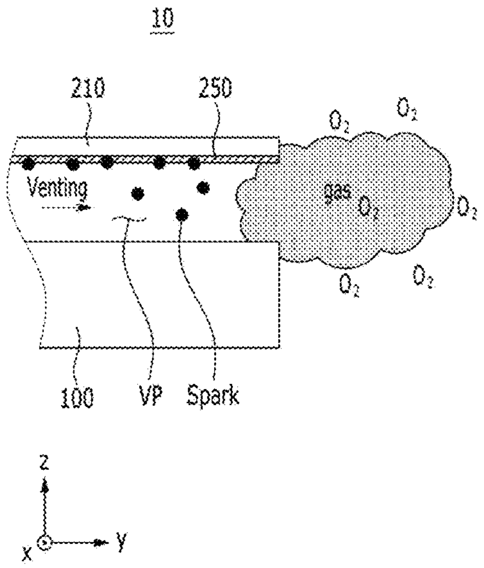

【FIG. 8】
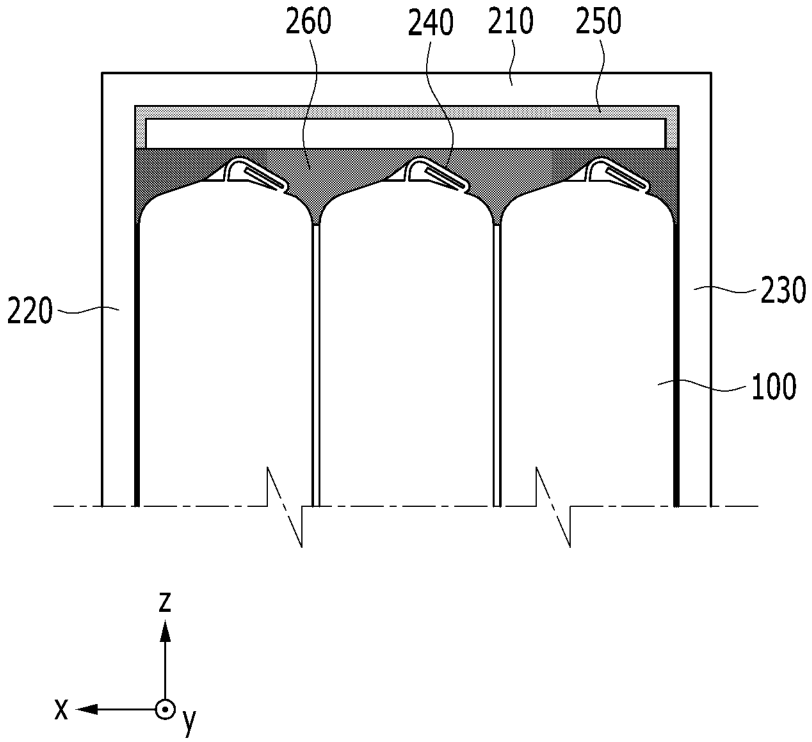

BATTERY PACK AND DEVICE INCLUDING THE SAME

CROSS-REFERENCE TO RELATED APPLICATIONS

This application is a national phase entry under 35 U.S.C. § 371 of International Application No. PCT/KR2023/009963, filed on Jul. 12, 2023, which claims priority to Korean Patent Application No. 10-2022-0089844, filed on Jul. 20, 2022 and Korean Patent Application No. 10-2023-0076240, filed on Jun. 14, 2023, the disclosures of each of which are incorporated herein by reference in their entireties.

TECHNICAL FIELD

The present invention relates to a battery pack and a device including the same, and more particularly, a battery pack improved in energy density and cooling performance and enhanced in safety, and a device including the same.

BACKGROUND

In modern society, as portable devices such as a mobile phone, a notebook computer, a camcorder and a digital camera has been daily used, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, the demand for development of the secondary battery is growing.

Currently commercialized secondary batteries include a nickel cadmium battery, a nickel hydrogen battery, a nickel zinc battery, and a lithium secondary battery. Among them, the lithium secondary battery has come into the spotlight because it has advantages, for example, being freely charged and discharged, and having very low self-discharge rate and high energy density.

Such a lithium secondary battery comprises an electrode assembly in which a cathode plate and an anode plate, each being coated with the cathode active material and the anode active material, are arranged with a separator being interposed between them, and an exterior material, i.e., a battery case, that seals and accommodates the electrode assembly together with the electrolyte.

Generally, the lithium secondary battery may be classified into a can-type secondary battery in which the electrode assembly is mounted in a metal can, and a pouch-type secondary battery in which the electrode assembly is mounted in a pouch of an aluminum laminate sheet, depending on the shape of the exterior material.

Recently, battery packs have been widely used for driving or energy storage in middle or large-sized devices such as electric vehicles or energy storage systems. A conventional battery pack includes one or more battery modules inside a pack case and a control unit such as a BMS (battery management system) that controls the charging and discharging of a battery pack. Here, the battery module is configured to include a large number of battery cells inside a module case. That is, in the case of a conventional battery pack, a large number of battery cells (secondary batteries) are accommodated inside a module case to configure each battery module, and one or more of such battery modules are accommodated inside a pack case to configure a battery pack.

In particular, a pouch-type battery has advantages in various aspects, such as light weight and small dead space during stacking, but has problems that it is vulnerable to external impact, and the assembly property is slightly reduced. Therefore, it is common to manufacture a battery pack by first modularizing a large number of cells and then housing them in a pack case. As a representative example, a conventional battery pack is configured by first housing a large number of battery cells inside a module case to configure a battery module, and then housing one or more of such battery modules inside the pack case. Moreover, a conventional battery module often stacks a large number of battery cells by using various components, such as stacking frames made of plastic material (also called cartridges), plates disposed at both ends in the cell stacking direction, and fastening members such as bolts. And, the stacked body formed in this way is often accommodated in the inside of a module case again to be modularized.

However, such a conventional battery packs may be disadvantageous in terms of energy density. Typically, in the process of housing a large number of battery cells in a module case and modulating them, various components such as module cases and stacking frames unnecessarily increase the volume of the battery pack or reduce the space occupied by the battery cells. Moreover, in addition to the space occupied by the components themselves such as the module case and the stacking frame, the housing space for the battery cells can be reduced in order to ensure assembly tolerances for such components. Therefore, conventional battery packs may have limitations in increasing energy density.

Further, conventional battery packs may be disadvantageous in terms of the assembly property. In particular, in order to manufacture a battery pack, it passes through a process of first modularizing a large number of battery cells to configure a battery module, and then housing the battery module in a pack case, which leads to a problem that the manufacturing process of the battery pack becomes complicated. Moreover, as disclosed in the prior literature, the process and structure of forming a cell stack using stacking frames, bolts, plates, and the like may be very complicated.

Further, in the case of a conventional battery pack, the module case is accommodated inside the pack case and the battery cells are accommodated inside the module case, and thus, there is also a problem that it is difficult to secure excellent cooling performance. In particular, if the heat of the battery cells accommodated in the module case is discharged to the outside of the pack case through the module case, the cooling efficiency may decrease and the cooling structure may also become complicated.

In addition, a large number of battery cells included in a conventional battery pack are connected in series or parallel to each other to form a battery cell stack, thereby improving capacity and output, but there is a problem that the overall temperature may rise faster due to the accumulation of heat generated from the large number of battery cells in a narrow space within the battery module.

DETAILED DESCRIPTION OF THE INVENTION

Technical Problem

It is an object of the present invention to provide a battery pack exhibiting excellent energy density, assembly property and/or cooling performance, and a device including automobiles and the like.

It is another object of the present invention to provide a battery pack that prevents continuous thermal runaway phenomena, thereby improving the durability and safety, and a device including the same.

However, technical subjects of the present invention are not limited to the foregoing technical subjects, and any other technical subjects not mentioned will be clearly understood by a skilled person in the art from the following description.

Technical Solution

According to one embodiment of the present invention, there is provided a battery pack including a plurality of battery cells in which battery cells each including a sealing portion are stacked in one direction; a cell cover that covers at least a part of the plurality of battery cells; a venting passage formed between the sealing portion of the plurality of battery cells and the cell cover; and an adhesive layer disposed on an inner surface of the venting passage.

The sealing portion may be a portion formed by sealing one side portion facing the cell cover among the battery cells.

The cell cover includes a first side cover portion and a second side cover portion that cover side surfaces of the plurality of battery cells, and an upper side cover portion that covers upper portions of the plurality of battery cells, and the sealing portion may be disposed in an upper portion of the plurality of battery cells.

The upper side cover portion may be spaced apart from the sealing portion.

The adhesive layer may be disposed on an inner surface of the upper side cover portion.

The adhesive layer may be further disposed on an inner surface of at least a part of the first side cover portion and an inner surface of at least a part of the second side cover portion.

The cell cover covers the upper surface and both side surfaces of the plurality of battery cells, and may expose the lower surface of the plurality of battery cells.

The sealing portion may be bent one or more times.

The cell cover may have an integral shape thereof.

The cell cover may include stainless steel (SUS).

Each of the plurality of battery cells may be a pouch-type battery cell.

The battery pack may further comprise a pack case that accommodates the plurality of battery cells and the cell cover in an inner space.

According to another embodiment of the present invention, there is provided a device comprising the at least one battery pack.

Advantageous Effects

According to the present invention, when gas or flame is generated, high-temperature particles discharged from each battery cell are prevented from scattering to the outside, thereby preventing continuous thermal runaway phenomena.

The effects of the present invention are not limited to the effects mentioned above, and additional other effects not mentioned above will be clearly understood from the description of claims by those skilled in the art.

BRIEF DESCRIPTION OF THE DRAWINGS

FIG. 1 is a schematic perspective view which separates and shows a partial configuration of a battery pack according to an embodiment of the present invention;

FIG. 2 is an exploded perspective view which schematically shows a cell unit including a configuration of battery cells and a cell cover accommodated inside a battery pack according to an embodiment of the present invention;

FIG. 3 is a perspective view showing a state in which the components of FIG. 2 are combined;

FIG. 4 is a perspective view taken along the cut plane A of FIG. 3;

FIG. 5 is a front view of FIG. 4;

FIG. 6 is a view showing a state of a cell unit in which an ignition phenomenon has occurred according to a comparative example;

FIG. 7 is a view showing a state in which venting gas is discharged in the y-axis direction of FIG. 3; and FIG. 8 is a diagram showing a cell unit according to another embodiment of the present invention.

DETAILED DESCRIPTION OF THE EMBODIMENTS

Hereinafter, various embodiments of the present invention will be described in detail with reference to the accompanying drawings so that those skilled in the art can easily carry out them. The present invention can be modified in various different ways, and is not limited to the embodiments set forth herein.

Portions that are irrelevant to the description will be omitted to clearly describe the present invention, and like reference numerals designate like elements throughout the description.

Further, in the drawings, the size and thickness of each element are arbitrarily illustrated for convenience of description, and the present invention is not necessarily limited to those illustrated in the drawings. In the drawings, the thickness of layers, regions, etc. are exaggerated for clarity. In the drawings, for convenience of description, the thicknesses of a part and a region are exaggerated.

In addition, it will be understood that when an element such as a layer, film, region, or plate is referred to as being formed or disposed "on" or "above" another element, it should be interpreted as including not only a case where an element such as a layer, film, region, or plate is directly on the other element but also a case where intervening elements are present. In contrast, when an element such as a layer, film, region, or plate is referred to as being formed or disposed "directly on" another element, it may mean that other intervening elements are not present. Further, the word "on" or "above" means disposed on or below a reference portion, and does not necessarily mean being disposed on the upper end of the reference portion toward the opposite direction of gravity. Meanwhile, similarly to the case where it is described as being formed or disposed "on" or "above" another part, the case where it is described as being formed or disposed "below" or "under" another element will also be understood with reference to the above-mentioned contents.

Further, throughout the description, when a portion is referred to as "including" or "comprising" a certain component, it means that the portion can further include other components, without excluding the other components, unless otherwise stated.

FIG. 1 is a schematic perspective view which separates and shows a partial configuration of a battery pack according to an embodiment of the present invention.

FIG. 2 is an exploded perspective view which schematically shows a cell unit including a configuration of battery cells and a cell cover accommodated inside a battery pack according to an embodiment of the present invention.

FIG. 3 is a perspective view showing a state in which the components of FIG. 2 are combined.

Referring to FIGS. 1 to 3, the battery pack 1000 according to an embodiment of the present invention includes a battery cell 100, a cell cover 200, and a pack case 600.

The battery cell 100 may be a pouch-type battery cell. That is, the battery cell 100 is a pouch-type secondary battery, and may include an electrode assembly, an electrolyte, and a pouch exterior material.

Generally, the pouch-type battery cell 100 may be manufactured through a process of injecting an electrolyte into a cell case in a state where the electrode assembly is accommodated in the cell case, and sealing the cell case. For example, the cell case may be sealed by bonding both ends of the battery cell 100 and one side part connecting them.

A plurality of such battery cells 100 may be included in a battery pack. And, the plurality of battery cells 100 may be stacked in at least one direction. For example, referring to FIG. 1, the plurality of battery cells 100 may be stacked and disposed in a horizontal direction, for example, in a left-right direction (x-axis direction in the figure). Further, the plurality of battery cells 100 may also be disposed in a front-back direction (y-axis direction in the figure) as shown in FIG. 1.

Moreover, the plurality of battery cells 100 may be disposed so as to form a plurality of rows in the left-right direction and the horizontal direction while being disposed in the horizontal direction. For example, referring to FIG. 1, the plurality of battery cells 100 may be stacked in such a manner that two rows of cells disposed in the left-right direction are provided in the front-back direction.

The battery pack according to the present invention can employ various types of battery cells 100 known at the time of filing the present application, and therefore, detailed description of the configuration or the like of such battery cells 100 will be omitted.

The pack case 600 has an empty space formed therein and can accommodate a plurality of battery cells 100. For example, the pack case 600 may comprise an upper case 610 and a lower case 620 as shown in FIG. 1. As a more specific example, the lower case 620 is configured in a box shape having an open upper end and can accommodate a plurality of battery cells in the inner space. And, the upper case 610 may be configured in a lid shape that covers the open upper end of the lower case 620. At this time, the upper case 610 may be configured in a box shape having an open lower end. Further, the cell cover 200 may also be accommodated in the inner space of the pack case 600 together with the plurality of battery cells 100. The pack case 600 may be formed of a plastic or metal material. Further, the pack case 600 may employ exterior materials of various battery packs known at the time of filing of the present application.

The cell cover 200 may be configured to surround battery cells 100 in the inner space of a pack case. That is, the cell cover 200 may be configured to surround at least a part of the battery cells among the plurality of battery cells 100 included in the battery pack. Moreover, the cell cover may be provided to at least partially surround the battery cell 100.

Further, the cell cover 200 may be configured to support the stacked state of the plurality of battery cells 100 inside the pack case 600 through a structure surrounding the battery cells. For example, as shown in FIG. 1, a plurality of battery cells 100 may be stacked in a horizontal direction (x-axis direction in the drawing). At this time, the cell cover 200 may be configured to stably maintain the stacked state of the plurality of battery cells 100 stacked in the horizontal direction in this way.

According to the aspect of the present invention, a plurality of battery cells 100 can be directly seated and accommodated inside the pack case 600 without a module case. In particular, in the case of the battery cells 100, the exterior material is made of a soft material, so that it may be vulnerable to external impact and low in hardness. Therefore, it is not easy to accommodate only the battery cells 100 themselves inside the pack case 600 without accommodating them in the module case. However, according to the present invention, the plurality of battery cells 100 are coupled with the cell cover 200 while being at least partially surrounded by the cell cover 200, and are directly accommodated in the pack case 600, and the stacked state can be stably maintained.

Therefore, according to the aspect of the present invention, the battery pack 1000 does not need to be further provided with a module case, a stacking frame, or a fastening member such as a bolt for maintaining the stacked state of cells. Therefore, a space occupied by other components such as a module case or a stacking frame or a space for securing tolerance due thereto can be eliminated. Therefore, since the battery cells can occupy more space as much as the eliminated space, the energy density of the battery pack can be further improved.

Further, according to the aspect of the present invention, since a module case, a stacking frame, a bolt, and the like are not provided, the volume or weight of the battery pack can be reduced, and the manufacturing process can be simplified.

Further, according to the aspect of the present invention, handling of the battery cell 100 can be made easier. For example, when a plurality of battery cells 100 are accommodated inside a pack case, the battery cells 100 may be held by a jig or the like. At this time, the jig may hold the cell cover 200 surrounding the battery cell 100 without directly holding the battery cell 100. Therefore, it is possible to prevent the battery cell 100 from being damaged or damaged by the jig.

Further, according to the aspect of the present invention, the cell cover 200 is coupled to the battery cell 100, thereby capable of effectively protecting the battery cell 100 without a module case.

The cell cover 200 may be composed of various materials to secure rigidity. In particular, the cell cover 200 may be composed of a metal material. In the case of such a metal material, the stacked state of the battery cells can be more stably maintained, and the battery cells can be more safely protected from external impact. In particular, the cell cover 200 may comprise a steel material, more specifically a stainless steel (SUS) material. For example, the cell cover 200 may be entirely made of SUS material.

When the cell cover 200 is made of a steel material in this way, it has excellent mechanical strength and rigidity, so that the stacked state of the battery cells 100 can be more stably supported. Further, in this case, it is possible to more effectively prevent the battery cell 100 from being damaged or broken by an external impact such as an acicular body. Moreover, in this case, the handling of the battery cell can be made easier.

Further, when the cell cover 200 is made of a steel material as in the above embodiment, the overall structure can be stably maintained due to its high melting point when flames generate from the battery cells 100. In particular, since the steel material has a higher melting point than an aluminum material, it does not melt even by the flames ejected from the battery cell 100, and can stably maintain its shape. Therefore, it is possible to excellently secure flame propagation prevention or delay effects between battery cells 100, venting control effects, and the like.

The cell cover 200 may be configured to accommodate one or more battery cells 100. For example, as shown in FIGS. 2 and 3, one cell cover 200 may be configured to surround one battery cell 100 or a plurality of battery cells 100. In this case, the cell cover 200 is individually coupled for each battery cell 100 among the plurality of battery cells 100, or the cell cover 200 may be configured to surround two or more battery cells 100 together.

The cell cover 200 may be at least partially adhered to the outer surface of the battery cell 100. For example, the inner surface of the cell cover 200 may be adhered to the accommodating portion of the battery cell 100.

One or more cell covers 200 may be included in the battery pack. In particular, the cell cover 200 may be configured so that the plurality of battery cells 100 included in a battery pack are grouped into a unit. In this case, one cell cover 200 may constitute one cell unit 10. Further, one cell unit 10 may include one or more battery cells 100. The battery pack may include a large number of cell units, and in this case, a large number of cell covers 200 may be included in the battery pack. As an example, when the cell cover 200 is configured to surround one battery cell 100, the battery pack may include the same number of cell covers 200 as the number of battery cells 100. As another example, when the cell cover 200 is configured to surround two or more battery cells 100, the battery pack may include a smaller number of cell covers 200 than the number of battery cells 100.

The cell cover 200 may be configured to support the plurality of battery cells 100 in an upright state. As shown in FIG. 2, each battery cell 100 has two wide surfaces, and corner portions of the wide surfaces may have a sealing portion or a folded portion of the pouch exterior material. Therefore, it is generally difficult to stack the battery cells 100 in a shape of being erected in a vertical direction. However, in the battery pack according to the present invention, the cell cover 200 may be configured to surround one or more battery cells 100 and support the surrounded battery cells 100 in an erected state, that is, an upright state.

In particular, the cell cover 200 may be configured such that a large number of battery cells 100 can be stacked in a horizontal direction in a state of being erected in the up and down direction. For example, as in the embodiment shown in FIGS. 1 to 3, a large number of cell covers 200 are stacked with each other in a horizontal direction, and each cell cover 200 may be configured to surround one or more battery cells 100. In this case, the cell cover 200 makes it possible to stably maintain the configuration in which a large number of battery cells 100 are stacked side by side in a horizontal direction in a state in which each is erected.

In particular, the cell cover 200 may be configured to be self-supportable in the inner space of the pack case 600. That is, the cell cover 200 may be configured to maintain an upright state by itself without the aid of other components provided in the battery pack, such as the pack case 600 or the battery cell 100.

For example, in the embodiment of FIG. 1, the cell cover 200 may be directly seated on the bottom surface of the lower case 620. At this time, a part of the cell cover 200 and a lower end of the cell cover 200 may be seated in direct contact with the bottom surface of the lower case 620. At this time, a thermal resin layer 626 may be formed on the bottom surface of the lower case 620. The thermal resin layer 626 may transfer heat to a heat sink so that heat generated in the battery cell 100 is dissipated through a heat sink (not shown). Although not shown, a heat sink may be formed under the thermal resin layer 626. As an example, the heat sink is formed on the bottom surface of the lower case 620, and a thermal resin layer 626 may be applied to the upper surface of the heat sink. Since the thermal resin layer 626 has adhesive properties, the cell cover 200 and/or the battery cell 100 may be coupled to the bottom surface of the lower case 620 or the heat sink. The thermal resin layer 626 can more stably maintain the upright state of the battery cell 100 and the cell cover 200.

In addition, the cell cover 200 may be configured to stably maintain the seated state when the lower end is seated in this way. At this time, when the cell cover 200 is composed of a metal material having excellent rigidity such as steel, especially a SUS material, the self-supporting state can be maintained more stably. Therefore, in this case, the upright state of the battery cell 100 can be supported more reliably.

The cell cover 200 may be configured to partially surround the battery cell so that at least one side of the surrounded battery cell is exposed to the outside. That is, the cell cover 200 may be configured to surround only a part of the battery cell 100 without completely surrounding the battery cell 100 as a whole. In particular, the cell cover 200 may be configured such that at least one side of the battery cell is exposed toward the pack case.

For example, referring to the embodiments shown in FIGS. 2 and 3, the cell cover 200 is configured to surround one battery cell 100, but the surrounded battery cell 100, that is, the lower portion of the battery cell 100 accommodated in the inner space may not be surrounded by the cell cover 200. Therefore, the lower portion of the battery cell 100 is exposed toward the pack case 600 and may directly face the pack case 600. In particular, referring to the embodiment shown in FIG. 1, the lower portion of the battery cell 100 may be exposed toward the bottom surface of the lower case 620.

According to the embodiment of the present invention, the cooling performance of the battery pack can be secured more effectively. In particular, according to the above embodiment, the battery cell 100 and the pack case 600 may be brought into direct face-to-face contact. Therefore, heat emitted from each battery cell 100 is directly transferred to the pack case 600, thereby capable of improving the cooling performance. Further, in this case, since a separate cooling structure does not need to be provided between the battery cell 100 and the pack case 600, efficient cooling performance can be realized. Further, in this case, a space for flowing a coolant such as air between the battery cells 100 may not be provided.

Meanwhile, in the battery pack according to the present invention, a thermal interface material (TIM) may be interposed between mutually different components in order to increase heat transfer performance. For example, the TIM may be filled between the battery cell 100 and the cell cover 200, between the cell cover 200 and the pack case 600, and/or between the battery cell 100 and the pack case 600. In this case, the cooling performance of the battery pack, such as dual cooling performance, can be further improved.

In particular, the cell cover 200 may be configured to surround an edge portion that is not provided with an electrode lead among various edge portions of the battery cell 100 accommodated therein. For example, referring to the embodiment shown in FIG. 2, the battery cell 100 may comprise two electrode leads 110, that is, a cathode lead and an anode lead. At this time, the two electrode leads may be respectively positioned at the front side edge portion and the rear side edge portion. At this time, the cell cover may be configured to surround one of the remaining two edge portions excluding the front side edge portion and the rear side edge portion.

Referring to FIGS. 2 and 3, the battery cell 100 may be formed in a substantially hexahedral shape. And, the electrode leads 110, that is, an anode lead and a cathode lead may be respectively formed on two of the six surfaces. Further, the cell cover 200 is provided to cover at least a part of three of the remaining four surfaces of the six-sided battery cell 100 excluding the two surfaces on which the electrode leads 110 are formed.

According to the embodiment of the present invention, it is possible to guide the discharge direction of the flame or the like to the exposed side surface of the cell cover 200. For example, according to the embodiment, since the front side and the rear side of the cell cover 200 where the electrode lead 110 is located are open, a flame or the like can be discharged in such an opened direction. In particular, when the cell cover 200 is configured such that the front direction and the rear direction are open as described above, side directional venting can be easily realized.

According to the embodiment of the present invention, a configuration for supporting and protecting one or more battery cells can be easily realized as one cell cover 200. In particular, according to the above embodiment, the lower side edge portion may be in direct face-to-face contact with the pack case 600 without being surrounded by the cell cover 200. Therefore, the heat of the battery cells 100 surrounded by the cell cover 200 can be quickly and smoothly discharged to the lower pack case 600 side. Thus, the cooling performance of the battery pack can be more effectively secured.

In particular, such a configuration can be more effectively implemented when cooling is mainly performed in the lower portion of the pack case 600. For example, in the case of a battery pack mounted on an electric vehicle, since it is mounted on the lower portion of the vehicle body, cooling may be mainly performed in the lower portion of the pack case 600. At this time, when the lower edge portion of each battery cell 100 is in face-to-face contact with the pack case as in the above embodiment, heat is quickly transferred from each battery cell 100 to the pack case side, so that the cooling performance can be further improved.

Further, according to the above embodiment, when high-temperature gas, flame, or the like is discharged from the battery cell 100 in a situation such as thermal runaway, it is possible to effectively prevent the discharged gas or flame from being directed to the upper side. In particular, when a passenger is located on the upper side of the battery pack as in an electric vehicle or the like, according to the above embodiment, it is possible to suppress or delay the flow of gas, flame, and the like toward the passenger.

Referring to FIGS. 2 and 3, the cell cover 200 may be formed in a shape similar to the letter n. And, the cell cover 200 may be configured to cover other portions of the battery cell 100 accommodated therein, except for the front side and the rear side where the electrode lead protrudes through such a shape, and the lower side. That is, the cell cover 200 may be provided to cover the outer side and the upper side of the accommodating portion of the battery cell accommodated therein.

More specifically, the cell cover 200 may include an upper side cover portion 210, a first side cover portion 220, and a second side cover portion 230 as shown in FIG. 2.

Here, the upper side cover portion 210 may be configured to surround the upper portion of the battery cell 100 accommodated therein. In particular, the upper side cover portion 210 may be configured to contact with or be spaced apart from the upper side edge portion of the battery cell 100. Further, the upper side cover portion 210 may be configured in a planar shape. In this case, the upper side cover portion 210 may have a cross section formed in a straight line shape in a horizontal direction, and may surround the upper side edge portion of the battery cell 100 in a straight line shape from the outside.

The first side cover portion 220 may be configured to extend downward from one end of the upper side cover portion 210. For example, the first side cover portion 220 may be configured to extend downward (−Z axis direction in the figure) at the left side end of the upper side cover portion 210. Moreover, the first side cover portion 220 may be formed in a planar shape. At this time, the first side cover portion 220 may be configured in a bent shape at the upper side cover portion 210.

Further, the first side cover portion 220 may be configured to cover the outer side of one side accommodating portion of the battery cell 100 accommodated therein. For example, when one battery cell 100 is accommodated in the cell cover 200, the first side cover portion 220 may be configured to cover the left side surface of the accommodating portion of the accommodated battery cell 100 from the left side. Here, the first side cover portion 220 may directly contact the outer side surface of the accommodating portion.

The second side cover portion 230 may be positioned to be spaced apart from the first side cover portion 220 in a horizontal direction. Further, the second side cover portion 230 may be configured to extend downward from the other end of the upper side cover portion 210. For example, the second side cover portion 230 may be configured to extend long in a downward direction at the right end of the upper side cover portion 210. Moreover, the second side cover portion 230 may also be configured in a planar shape like the first side cover portion 220. At this time, the second side cover portion 230 and the first side cover portion 220 may be disposed parallel to each other while being spaced apart in a horizontal direction.

Further, the second side cover portion 230 may be configured to surround the outer side of the other side accommodating portion of the battery cell 100 accommodated therein. For example, when one battery cell 100 is accommodated in the cell cover 200, the second side cover portion 230 may be configured to surround the right side surface of the accommodating portion of the accommodated battery cell 100 from the right side. Here, the second side cover portion 230 may directly contact the outer side surface of the accommodating portion.

In the above embodiment, the inner space may be defined by the upper side cover portion 210, the first side cover portion 220 and the second side cover portion 230. Further, the cell cover 200 may accommodate one or more battery cells in the inner space defined in this way.

Further, in the above embodiment, lower side ends of the first side cover portion 220 and the second side cover portion 230 may contact the bottom surface of the pack case 600. In particular, the contact configuration between the lower side ends of the first side cover portion 220 and the second side cover portion 230 and the pack case 600 may be configured to extend long in the front-back direction (y-axis direction in the figure). According to such an embodiment, the self-supporting configuration of the cell cover 200 that can maintain the battery cell 100 accommodated therein in an upright state can be realized more stably.

Moreover, the first side cover portion 220 and the second side cover portion 230 may have the same height as each other. That is, the first side cover portion 220 and the second side cover portion 230 may have the same length extending downward from the upper side cover portion 210. In this case, the self-supporting configuration of the cell cover 200 can be more easily realized.

Meanwhile, the cell cover 200 and the battery cell 100 according to an embodiment of the present invention will be described again. The upper side cover portion 210 may face the upper side edge portion of the battery cell 100 and may surround the upper side edge portion together with the first side cover portion 220 and the second side cover portion 230.

Further, the cross-sectional area of the first side cover portion 220 and the second side cover portion 230 is formed larger than the cross-sectional area of the battery cell 100 which the first side cover portion 220 and the second side cover portion 230 face, thereby being able to prevent the accommodating portion from being exposed to the outside and secure the safety to a maximum.

Meanwhile, the battery cell 100 may include a sealing portion 240 (see FIG. 4). The sealing portion 240 (see FIG. 4) may be a portion formed by sealing one side portion of the battery cell 100 facing the cell cover 200. The sealing portion 240 (see FIG. 4) may be sealed by a method such as heat sealing, and may be bent one or more times to improve sealing performance. For example, the sealing portion 240 (see FIG. 4) may be a double side folded portion.

In the embodiment of FIG. 2, the upper side edge portion is a sealing portion 240 (see FIG. 4) of the battery cell 100 and may be a double side folded portion. The lower side edge portion may be an unsealed portion of the battery cell 100.

Here, the cell cover 200 may be configured to surround the battery cell 100, wherein at least a part of the sealed portion is surrounded, and at least a part of the unsealed portion is not surrounded, and exposed to the outside. For example, referring to the embodiment of FIG. 2, the cell cover 200 may be configured to cover an upper side edge portion which is a part of the sealing portion of the battery cell 100. In this case, the battery cell 100 accommodated inside the cell cover 200 may be configured such that the upper side edge portion, which is a sealing portion, faces the upper side cover portion 210. In addition, the cell cover 200 may surround the battery cell 100 so that the lower side edge portion, which is the unsealed portion of the battery cell 100 is exposed to the outside. In this case, the lower side edge portion which is an unsealed portion of the battery cell 100 may be disposed on the open surface of the cell cover 200.

In the battery cell 100, the upper side edge portion as a sealing portion may be more vulnerable to discharge of relatively high-temperature gas or flame than the lower side edge portion, which is an unsealed portion. By the way, according to the above embodiment, the upper side edge portion, which is a sealing portion, is arranged so as to face the upper side cover portion 210, which may be more advantageous for directional venting.

Further, in the battery cell 100, the lower side edge portion as the unsealed portion has a relatively larger cross-sectional area than the upper side edge as the sealing portion, is provided in a flat shape, and may be disposed on the open surface of the cell cover 200 and directly contact the thermal resin layer 626 of FIG. 1 to thereby increase cooling efficiency.

Furthermore, when the lower case 620 is seated on one surface of the vehicle body, the first side cover portion 220 and the second side cover portion 230 may extend from the upper side cover portion 210 toward one surface of the vehicle body, and the upper side edge portion may be disposed farther from one surface of the vehicle body than the lower side edge portion. That is, when the lower case 620 is seated on one surface of the vehicle body, the cell cover 200 may be configured such that a surface disposed relatively close to one surface of the vehicle body is opened.

Conversely, when the upper case 610 is seated on one surface of the vehicle body, the first side cover portion 220 and the second side cover portion 230 may extend away from the one surface of the vehicle body at the upper side cover portion 210, and the upper side edge portion may be disposed closer to one side of the vehicle body than the lower side edge portion. That is, when the upper case 610 is seated on one surface of the vehicle body, the cell cover 200 may be configured such that a surface disposed relatively far from one surface of the vehicle body is opened.

That is, the arrangement of the cell cover 200 and the battery cell 100 can be set variously according to the relationship between the vehicle body, the pack case 600, and the configuration disposed on the vehicle body other than the pack case 600.

Meanwhile, in the above embodiment, the cell cover 200 having an n-shaped configuration has been mainly shown and described, but the cell cover 200 can be configured in various other shapes. For example, the cell cover 200 may be formed in various other shapes such as an I-shape, a U-shape, and an L-shape.

FIG. 4 is an exploded perspective view which schematically shows a partial configuration of a battery pack according to an embodiment of the present invention.

Referring to FIG. 2, the battery pack according to the present invention may further include a busbar assembly 300. Here, the busbar assembly 300 may be configured to electrically connect the plurality of battery cells 100 to each other. For example, as shown in FIG. 2, the busbar assembly 300 may be coupled to the electrode leads 110 of the plurality of battery cells 100 to electrically connects between the plurality of battery cells 100 in series and/or in parallel. The busbar assembly 300 may comprise a busbar terminal that is composed of an electrically conductive material such as copper or aluminum and is in direct contact with the electrode lead 110, and a busbar housing that is made of an electrically insulating material such as plastic and supports the busbar terminal.

Moreover, when the electrode leads 110 are provided on both sides of the battery cells 100, the busbar assembly 300 may also be included on both sides where the electrode lead 110 is provided. For example, as shown in FIG. 2, when the electrode lead 110 protrudes to both the front side (y-axis direction in the figure) and the rear side (−y-axis direction in the figure), the busbar assembly 300 may also be located on both the front side and the rear side.

The busbar assembly 300 may be coupled with one or more cell covers 200. At this time, the busbar assembly 300 may be coupled to an end of one cell cover 200. At this time, one or a plurality of battery cells 100 may be accommodated in one cell cover 200.

The busbar assembly 300 may be coupled with the cell cover 200 in various ways. For example, the busbar assembly 300 may be coupled and fixed to the cell cover 200 through various fastening methods such as adhesion, welding, fitting, hooking, bolting, and riveting.

Referring to FIGS. 2 and 3, the battery pack 1000 according to the present invention may further include an insulating cover portion 350 and an end plate 400. The insulating cover portion 350 is made of an electrical insulating material, prevents the busbar assembly 300 from being exposed to the outside by the end plate 400, and can secure and maintain electrical insulation.

The end plate 400 covers the front and rear surfaces of the plurality of battery cells 100 and may be coupled with the cell cover 200. The end plate 400 may include a first end plate 410 disposed on the front side of the battery cell 100 (y-axis direction of the figure), and a second end plate 420 disposed on the rear side of the battery cell 100 (in the −y axis direction in the figure).

The end plate 400 may be sealed and coupled to the cell cover 200 via welding.

At this time, the end plate 400 may secure structural stability of the cell unit 10 by fixing the busbar assembly 300 and the insulating cover portion 350. Meanwhile, the end plate 400 may be formed with a hole through which the insulating cover portion 350 is exposed, and in some cases, directional venting may be induced through the hole.

Next, the venting passage and the adhesive layer included in the battery pack 1000 according to the present embodiment will be described in more detail.

FIG. 4 is a perspective view taken along the cut plane A of FIG. 3.

FIG. 5 is a front view of FIG. 4.

Referring to FIGS. 4 and 5, an air gap may exist between the upper portion of the cell cover 200 and the battery cell 100. A venting passage VP (see FIG. 7) is formed through the air gap so that gas generated in the battery cell 100 can move. In particular, since the upper side edge portion of the battery cell 100 is formed with the sealing portion 240, relatively high-temperature gas or flame can be more easily discharged than the lower edge portion, which is an unsealed portion. When gas or flame generates, it can be released as high-temperature gas and spark through the venting passage VP (see FIG. 7), and sparks come into contact with external oxygen, or the like to cause ignition. Therefore, the battery pack of the present embodiment may include an adhesive layer 250 to prevent sparks, i.e., high-temperature particles from scattering to the outside, in order to solve the above-mentioned problems. The adhesive layer 250 may be disposed on the inner surface of the space between the cell cover 200 and the battery cell 100. Specifically, the adhesive layer 250 may be disposed on the inner surface of the upper side cover portion 210. Further, the adhesive layer 250 may be further disposed on at least a part of the inner surface of the first side cover portion 220 and at least a part of the inner surface of the second side cover portion 230. For example, the adhesive layer 250 may be disposed on an inner surface of the upper side cover portion 210, an inner surface of a part of the first side cover portion 220 extending downward from one end of the upper side cover portion 210, and an inner surface of a part of the second side cover portion 230 extending downward from the other end of the upper side cover portion 210. In particular, since a relatively large adhesive layer is formed between the sealing portion 240 and the upper side cover portion 210, it is possible to catch more sparks.

When the adhesive layer 250 is formed on the cell unit 10, particles that move along the air gap, which is the venting passage when the battery cell 100 ignites, can adhere to the adhesive layer 250, thereby capable of preventing particles from scattering to the outside of the cell unit. When the emission of high-temperature particles, i.e., sparks, is restricted by the adhesive layer 250, the possibility of the sparks coming into contact with external oxygen is reduced, and thus additional thermal runaway phenomena can be prevented.

The adhesive layer 250 may be attached in layered shape to the inside of the venting passage, or may be applied in a liquid form and then formed as a layer.

The adhesive layer 250 may include an adhesive material. The adhesive material that can be used for the adhesive layer 250 can be used irrespective of the type as long as they have adhesive properties that enables particles to adhere thereto. Examples of the adhesive material include those containing acrylates or silicones, and in the adhesive material, ester rubber, phenol resin, or other materials may be used as auxiliaries, or low-molecular materials such as castor oil or polyisobutylene may be further mixed.

The adhesive layer 250 may be provided on the venting passage. The venting passage may extend along the y-axis direction shown in FIGS. 2 and 3. When directional venting is induced through the hole of the end plate 400, gases and flames are discharged along the venting passage. At this time, if the emission of high-temperature particles, i.e., sparks, is restricted by the adhesive layer 250, the possibility of the sparks coming into contact with external oxygen is reduced, and thus additional thermal runaway phenomena can be prevented.

FIG. 6 is a view showing a state of a cell unit in which an ignition phenomenon has occurred according to a comparative example.

FIG. 7 is a view showing a state in which venting gas is discharged in the y-axis direction of FIG. 3.

Referring to FIG. 6, the cell unit may include a venting passage formed between the cell cover 21 and the battery cell 1. The battery cell 1 may generate a large amount of heat during charging and discharging process, and if the temperature is higher than the proper temperature due to reasons such as overcharging, the performance may deteriorate. Excessive temperature rise may cause explosion or ignition. When the battery cell 1 ignites, the internal material of the cell may be ejected along with high-temperature inflammable gas to the outside. Such internal materials are mainly materials such as C, Cu, Al, Ni, Co, Mg, and Li, and are ejected in the form of high-temperature particles, i.e., sparks.

Meanwhile, when such sparks come into contact with an inflammable gas discharged together or external oxygen, an ignition phenomenon occurs, and thus continuous thermal runaway phenomena may occur inside and outside the battery pack including the battery cell 1.

Referring to FIG. 7, the cell unit 10 according to the present embodiment may include a venting passage VP formed between the battery cell 100 and the upper side cover portion 210. The venting passage VP may be for discharging gas generated from the battery cell 100 to the outside of the cell cover 200. The venting passage VP may be formed in a separation space between the cell cover 200 and the battery cell 100. A venting part for discharging internal gas of the battery cell 100, for example, a hole of the end plate 400 described in FIGS. 2 and 3 may be located at one end of the venting passage VP. Flames, gases, and the like discharged from each battery cell 100 to the venting passage VP may move along the venting passage VP and be discharged to the outside through an outlet (not shown) provided in the cell unit 10.

As shown in FIG. 7, when the battery cell 100 ignites, particles moving along the venting passage VP may be attached to the adhesive layer 250, and thus particles may be prevented from scattering to the outside of the cell unit 10. When the emission of high-temperature particles, i.e., sparks, is restricted by the adhesive layer 250, the possibility of the spark coming into contact with external oxygen is lowered, and thus additional thermal runaway phenomena can be prevented.

FIG. 8 is a diagram showing a cell unit according to another embodiment of the present invention.

The embodiment of FIG. 8 is a modification of the embodiment of FIG. 5, and the cell unit according to the present embodiment may further include a heat transfer member 260 covering an upper portion of the battery cell 100. The heat transfer member 260 may be coated and formed with a silicon-based material or formed as a thermally conductive pad. The adhesive layer 250 may be formed between the heat transfer member 260 and the upper side cover portion 210. The adhesive layer 250 may be formed on an inner surface of the upper side cover portion 210, an inner surface of a part of the first side cover portion 220 extending downward from one end of the upper side cover portion 210 to the heat transfer member 260, and an inner surface of a part of the second side cover portion 230 extending downward from the other end of the upper side cover portion 210 to the heat transfer member 260. However, the formation position of the adhesive layer 250 is not limited thereto, and may be directly applied or attached to the upper surface of the heat transfer member 260.

In addition to the differences described above, all the contents described in FIG. 5 are applicable to the present embodiment.

Meanwhile, although not specifically mentioned above, the battery pack according to an embodiment of the present invention may further include a battery management system (BMS) and/or a cooling device that control and manage battery's temperature, voltage, etc.

The battery pack according to an embodiment of the present invention can be applied to various devices. For example, a device to which a battery pack is applied may be vehicle means such as an electric bike, an electric vehicle, and a hybrid electric vehicle. However, the above-mentioned device is not limited thereto, and the battery pack according to the present embodiment can be used in various devices other than the above-mentioned examples, which also falls under the scope of the present invention.

The terms representing directions such as the front side, the rear side, the left side, the right side, the upper side, and the lower side have been used in the present embodiment, but the terms used are provided simply for convenience of description and may become different according to the position of an object, the position of an observer, or the like.

Although the invention has been described in detail above with reference to preferred embodiments of the present invention, the scope of the present invention is not limited thereto, and various modifications and improvements can be made by those skilled in the art using the basic concepts of the present invention, which are defined in the appended claims, which also falls within the scope of the present invention.

DESCRIPTION OF REFERENCE NUMERALS

10, 20: cell unit
VP: venting passage
100: battery cell
200: cell cover
210: upper side cover portion
220: first side cover portion
230: second side cover portion
240: sealing portion
250: adhesive layer
260: thermal resin layer
300: busbar assembly
350: insulating cover portion
400: end plate
600: pack case
610: upper case
620: lower case
1000: battery pack

The invention claimed is:

1. A battery pack comprising:

a plurality of battery cells in which battery cells each including a sealing portion are stacked in a first direction;

a cell cover that covers at least a part of each of the plurality of battery cells;

a venting passage defined between the sealing portion of each of the plurality of battery cells and the cell cover; and an adhesive layer disposed on an inner surface of the cell cover that defines a boundary of the venting passage.

2. The battery pack of claim 1, wherein: the sealing portion of each battery cell is a portion formed by sealing a side portion of the battery cell facing the cell cover.

3. The battery pack of claim 1, wherein: the cell cover includes a first side cover portion and a second side cover portion that respectively cover side surfaces of the plurality of battery cells, and an upper side cover portion that covers upper portions of the plurality of battery cells, and the sealing portion of each battery cell is disposed in the upper portion of the respective battery cell.

4. The battery pack of claim 3, wherein: the upper side cover portion is spaced apart from the sealing portion of each battery cell.

5. The battery pack of claim 3, wherein: the adhesive layer is disposed on an inner surface of the upper side cover portion of the cell cover.

6. The battery pack of claim 5, wherein: the adhesive layer is further disposed on an inner surface of at least a part of the first side cover portion and an inner surface of at least a part of the second side cover portion.

7. The battery pack of claim 1, wherein: the cell cover covers the upper surface and the side surfaces of the plurality of battery cells, and the lower surface of each of the plurality of battery cells is exposed at an open portion of the cell cover.

8. The battery pack of claim 1, wherein: the sealing portion of each battery cell is bent one or more times.

9. The battery pack of claim 1, wherein: the cell cover has an integral shape.

10. The battery pack of claim 1, wherein: the cell cover includes stainless steel (SUS).

11. The battery pack of claim 1, wherein: each of the plurality of battery cells is a pouch-type battery cell.

12. The battery pack of claim 1, further comprising: a pack case that accommodates the plurality of battery cells and the cell cover in an inner space thereof.

13. A device comprising the battery pack of claim 1.

* * * * *